UNITED STATES PATENT OFFICE.

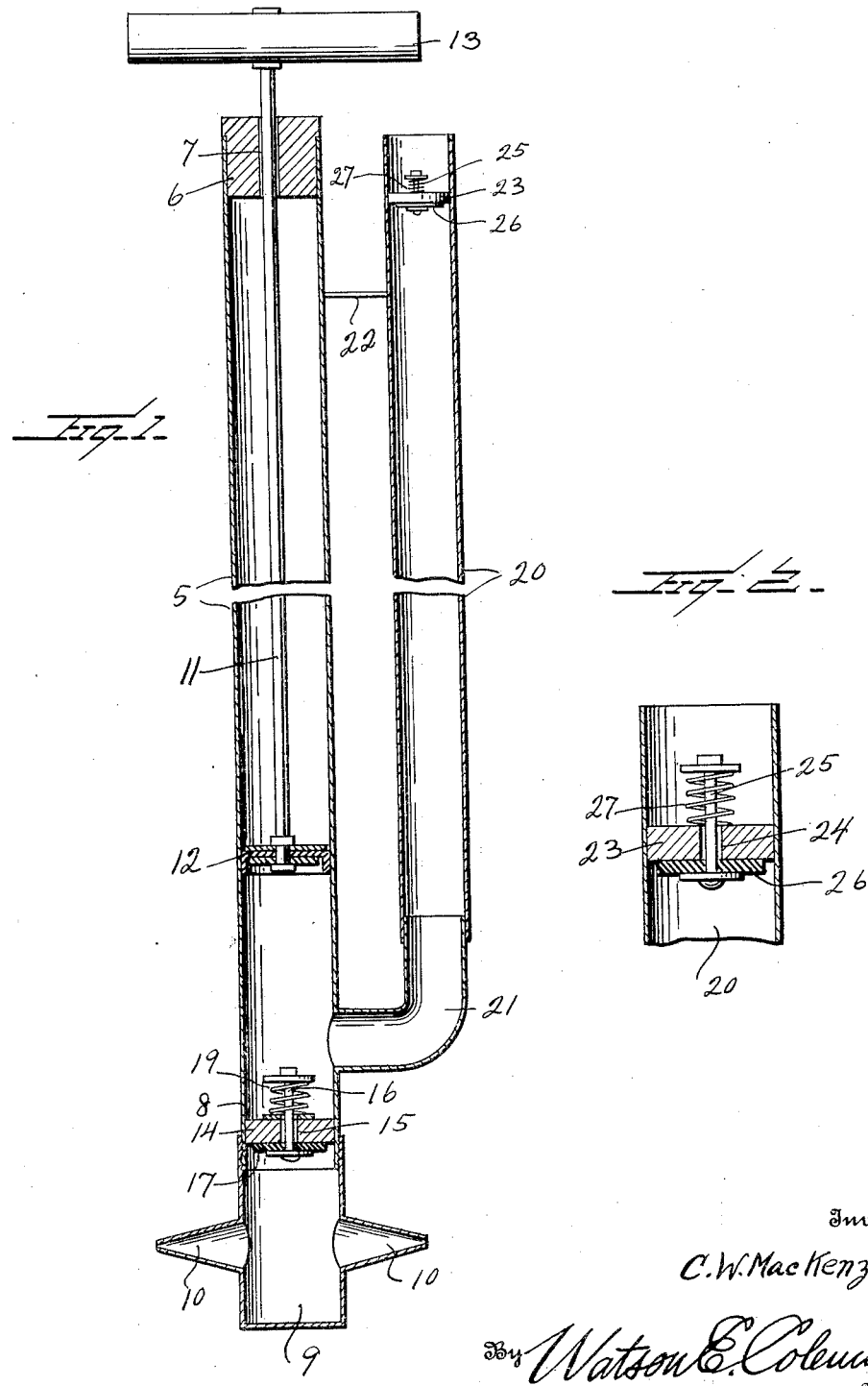

CYRUS W. MacKENZIE, OF WAVERLY, INDIANA.

MILK AERATOR AND COOLER.

1,374,309.   Specification of Letters Patent.   Patented Apr. 12, 1921.

Application filed April 24, 1920. Serial No. 376,301.

*To all whom it may concern:*

Be it known that I, CYRUS W. MACKENZIE, a citizen of the United States, residing at Waverly, in the county of Morgan and State of Indiana, have invented certain new and useful Improvements in Milk Aerators and Coolers, of which the following is a specification, reference being had to the accompanying drawings.

This invention relates to a milk aerator and cooler, and has for its object to provide a device of this character capable of being readily inserted in any receptacle to inject air into the milk.

Another object is to provide a device of this character which is simple, compact and can be operated by any one.

Still another object of the invention is to provide a device of this character wherein the air compressed in the device is forced through restricted openings under pressure so as to eliminate animal heat and thereby reduce the temperature of the milk.

With these and other objects in view the invention consists in the improved construction and arrangement of parts to be hereinafter more particularly described, fully claimed and illustrated in the accompanying drawings, in which:—

Figure 1 is a longitudinal sectional view of a milk aerator and cooler constructed in accordance with an embodiment of the invention.

Fig. 2 is an enlarged sectional view of the air inlet valve.

Referring to the drawings, 5 designates a pump cylinder having a bearing member 6 on one end provided with a central opening 7. Threaded or otherwise secured on the end 8 of the cylinder 5 is an air receiving member 9 from the sides of which opposed outlet members 10 project. Each of the outlets are conical in formation, the base of the conical portion being secured to the member 9. A discharge opening is formed in the apex of each conical outlet. In view of this conical formation, the air is compressed within the cylinder and the base of the outlets, and is forced under pressure through the restricted openings. Slidably mounted in the bearing member 6 through the opening 7 is a pump rod 11 having a piston 12 on one end and a handle 13 on the other end. This piston is used to compress the air within the cylinder and force the same through the outlets 10.

In order to prevent the air that is compressed within the cylinder 5 from being drawn from the cylinder upon the upward stroke of the piston, a valve seat and mounting 14 is provided and is disposed in the end portion 8 of the cylinder 5, adjacent the member 9, said mounting having a central opening 15 through which the valve stem 16 of a valve 17 passes. A spring 19 is engaged with the stem and the mounting to normally hold the valve 17 in engagement with the valve seat and mounting 14. This valve is operated by air pressure upon downward movement of the piston to permit the passage of air through the outlets 10. The valve 17 not only prevents milk from entering the pump cylinder but also prevents the milk from entering the air inlet pipe 21 so that in view of the particular position of the valve 17, it is not necessary to close the end of the elbow 21.

In order to supply the proper quantity of air to the cylinder and at the same time permit the piston to properly compress the air, an air inlet pipe 20 is provided. This pipe extends longitudinally of the cylinder 5 and is provided with an elbow 21 on one end which communicates with the pump cylinder 5 adjacent the mounting 14 of the valve. The upper end of the pipe terminates in the plane of the upper end of the pump cylinder 5, a web 22 being provided for connecting the upper portion of the air inlet pipe to the pump cylinder. Mounted in the air inlet pipe adjacent its upper end is a valve mounting 23 having a central opening 24 through which the valve stem 25 of a valve 26 passes, the valve stem being provided with a spring 27. By means of this valve the air previously admitted is prevented from escaping upon the compression stroke of the piston.

The device is constructed of a length sufficient to be inserted in any milk receptacle and at the same time to permit a proper supply of air to enter the air inlet pipe 20. When the piston is drawn upwardly by the handle 13 it creates a suction which opens the valve 26 and draws in a quantity of air. Upon the downward or compression stroke of the piston the air previously admitted to the pump cylinder 5 is compressed, thereby closing the valve 26 and opening the valve 25. The compressed air is thereby forced through the broad or base portion of the conical outlets and through the restricted openings under pressure from the piston, thereby driving out the animal heat and decreasing the temperature of the milk.

In view of the fact that the end of the pump cylinder is closed, the same can be supported on the bottom of the vessel to permit the piston to properly compress the air. At the same time the inlet pipe is of sufficient length to admit the air closely adjacent the valve 25 and at the same time extend above the surface of the milk. In addition to this, the valves 25 and 26 are alternately operated so that the danger of milk being drawn into the pump or the danger of air escaping from the outlet is eliminated. All of these features are possessed by a device that is simple and compact.

The invention having been set forth, what is claimed as new and useful is:—

1. An aerating device comprising a pump, outlets projecting from the sides of the pump adjacent one end thereof, an air inlet member carried by and communicating with the pump, and a valve in the pump and the air inlet member.

2. An aerating device comprising a pump, opposed outlet members extending from the sides of the pump adjacent one end thereof, each of said outlet members being conical, the air being discharged through the apex of each conical outlet, a valve seat in said pump closely adjacent the outlet members, a spring pressed valve supported by said valve seat, said valve controlling the passage of air through the outlets, and an air inlet for said pump.

3. An aerating device comprising a pump, outlet members extended from one end of the pump in diametrically spaced relation to each other, a valve in said pump for controlling the passage of air through the outlet members, an air inlet pipe extending longitudinally of the pump and communicating with the pump adjacent the valve, and a valve in said air inlet pipe, said valves being alternately operable by the operation of the pump.

4. An aerating device comprising a pump, a valve in one end of the pump, an air pressure casing detachably connected to said end of the pump, the casing having opposed outlet spouts, the mouth of each spout being restricted whereby air discharged into the casing by the pump is forced under pressure through said spouts upon actuation of the pump.

5. An aerating device comprising a pump, a valve mounted in one end of the pump, an air pressure casing open at one end, said casing being adapted to receive said end of the pump, diametrically opposed conical outlet members carried by the casing midway of the ends of the casing, whereby a quantity of air discharged into the casing and conical outlets is forced under pressure through the apex of said outlet members upon actuation of the pump.

In testimony whereof I hereunto affix my signature.

CYRUS W. MacKENZIE.